United States Patent
Chen et al.

(10) Patent No.: US 6,724,913 B1
(45) Date of Patent: Apr. 20, 2004

(54) DIGITAL WATERMARKING

(75) Inventors: Trista Chen, Hualien (TW); Wen-Hsing Hsu, Hsinchu (TW)

(73) Assignee: Wen-Hsing Hsu, Hsinchu (TW)

( * ) Notice: Subject to any disclaimer, the term of this patent is extended or adjusted under 35 U.S.C. 154(b) by 565 days.

(21) Appl. No.: 09/666,294

(22) Filed: Sep. 21, 2000

(51) Int. Cl.$^7$ ................................................ G06K 9/00
(52) U.S. Cl. ...................... 382/100; 380/201; 380/210; 380/287; 713/176; 713/179
(58) Field of Search ................................ 382/100, 232, 382/115, 240; 380/51, 54, 59, 210, 252, 287, 201; 381/73.1; 704/273; 709/217; 713/176, 179; 348/460, 461, 463; 370/522, 523, 524, 525, 526, 527, 528, 529; 283/74, 75, 76, 77, 78, 79, 81, 85, 93

(56) References Cited

U.S. PATENT DOCUMENTS

| | | | | |
|---|---|---|---|---|
| 5,713,032 A | * | 1/1998 | Spencer | 715/515 |
| 5,892,900 A | * | 4/1999 | Ginter et al. | 713/200 |
| 5,943,422 A | * | 8/1999 | Van Wie et al. | 705/54 |
| 5,946,414 A | * | 8/1999 | Cass et al. | 382/183 |
| 5,974,548 A | * | 10/1999 | Adams | 713/200 |
| 6,122,403 A | * | 9/2000 | Rhoads | 382/233 |
| 6,141,441 A | * | 10/2000 | Cass et al. | 382/166 |
| 6,278,385 B1 | * | 8/2001 | Kondo et al. | 341/50 |
| 6,345,104 B1 | * | 2/2002 | Rhoads | 382/100 |
| 6,363,159 B1 | * | 3/2002 | Rhoads | 382/100 |
| 6,373,974 B2 | * | 4/2002 | Zeng | 382/135 |
| 6,542,927 B2 | * | 4/2003 | Rhoads | 709/217 |

* cited by examiner

Primary Examiner—Jayanti K. Patel
Assistant Examiner—Abolfazl Tabatabai
(74) Attorney, Agent, or Firm—Bacon & Thomas, PLLC (57) ABSTRACT

A watermarking method and device to embed a digitized watermark into a digital image file in the transformation domain is disclosed. In the watermarking technology of this invention, the digitized watermark is first error corrected to enhance its robustness. The digital image file to be embedded with the digitized watermark is first processed such that capacity of each element of the digital image file is calculated. The capacity of an element of the digital image file represents the highest value of tolerance for an element of the watermark to be added to the said element of the digital image file. Elements of the digital image file to which watermark elements may be added are selected and their addresses are recorded. The selected elements are then modulated so that they are suited to be embedded with elements of the digital watermark. After modulation the digitized watermark is embedded into the digital file by distributing the modulated elements of the watermark into the selected addresses. A 3*3 mask is used to calculate the capacity of each element of the digital image file.

12 Claims, 5 Drawing Sheets

FIG. 1

| 16 | 11 | 10 | 16 | 24 | 40 | 51 | 61 |
| --- | --- | --- | --- | --- | --- | --- | --- |
| 12 | 12 | 14 | 19 | 26 | 58 | 60 | 55 |
| 14 | 13 | 16 | 24 | 40 | 57 | 69 | 56 |
| 14 | 17 | 22 | 29 | 51 | 87 | 80 | 62 |
| 18 | 22 | 37 | 56 | 68 | 109 | 103 | 77 |
| 24 | 35 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 |

DIGITAL WATERMARKING

FIELD OF INVENTION

The present invention relates to method and device to generate digital watermarks so to embed the digital watermark into a digitized image, especially to a method and device to generate a digital watermark and to embed the digital watermark into a digitized image file in the transformation domain.

BACKGROUND OF INVENTION

In the field of digitized data processing, the term "watermark" indicates adding particular data into a digital data file, so that the particular data, after special treatment, may to appear for purposes of indication or certification when it is necessary.

Generally speaking, the requirements for a watermark, which is embedded in a digitized image, include capacity, imperceptibility and robustness, as described below:

Capacity: A preferred watermarking technology is one which is able to add a watermark into a digital file, instead of establishing a separate watermark file in addition to the digital file. A useful watermarking technology shall be able to allocate sufficient space in the digital file in which a digital watermark file containing a substantial amount of data may be embedded or hidden.

Imperceptibility: The watermark data embedded in a digital file shall not be identified or detected by observers who receive, process or observe the digital file or the converted format of the digital file. On the one hand, the watermark may cause damages or distortions to the digital file to be embedded. It is necessary to provide a technology to embed a watermark into a digital file, such that the damages or distortions are not perceptible to human senses. On the other hand, a watermark must be confidential. The watermark may not be perceptible to human senses, whereby detection, decoding, revision or even erase of the watermark may be avoided.

Robustness: Any digital file is subject to data processing such as compression, conversion, transformation and transmission, when it is transmitted, processed and stored. During the processing, noises, data and/or even other watermark will be added into the digital file for all kinds of reasons. A useful watermarking technology shall be able to protect the watermark from damages, destroy or disappearance during the processes, despite the influence of the abovementioned factors.

Due to the useful functions of watermarks, such as identification and certification, the watermarking technology has been considered of great economic values in $21^{st}$ century wherein digital data may be widely used. Especially when all kinds of media data are unlimitedly reproduced and distributed in the internet, watermarks are useful in the protection of copyrighted works from being unlawfully infringed. It can thus be expected that the watermarking technology will provide enormous contribution to the electronic commerce in the future.

In the field of the watermarking technology, Schyndel et al.'s "least significant bit" (LSB) watermarking technology, which they published in 1994, was recognized as beginner of this field. Schyndel et al. provided an improved watermarking technology by adding an "m-sequence" watermark in the conventional LSB coding of a digital file. This technology provided a method to embed watermark data into the most invisible portions of a digital image file. The watermark data were obtained from an m-sequenced coding. Receiver of the digital file embedded with the watermark may resolve the watermarked file with the same m-sequence coding, such that the watermark may be obtained. In 1996, Wolfgang et al. further provided a 2-dimensional coding for Schyndel et al.'s technology.

When the digital file to be watermarked is an image file, the watermark may be embedded into the image file in its spatial domain or in its transformation domain.

In the conventional art, as watermarking in the spatial domain is concerned, Matsui and Tanaka's watermarking technology is recognized as leading. This technology related to embedding a watermark into a gray leveled image file, a dithered binary image file, a fax image file, a color still image file or a video image file, as follows:

At first, a digital image file is obtained. The difference in gray level between every two adjacent pixels is calculated to generate a matrix of differences in gray levels. A cipher key table containing values of difference in gray levels and their corresponding output codes (0 or 1) is used to generate a matrix of output codes, based on the matrix of difference values.

Later, the watermark is converted into a string of 0's or 1's. The string is converted into a matrix with a format same as or relative to that of the matrix of output codes. A watermark matrix is thus obtained. The watermark matrix is then compared with the matrix of codes. If the values of 0 or 1 at a corresponding position in the two matrixes are different, the difference value at the corresponding position in the matrix of difference values is replaced by a difference value which has the same output code and which position is most close to the difference value represented by said code in the cipher key. After the process, a matrix of difference values embedded with a watermark is obtained. The matrix of differences may be reduced to a watermarked image, while the watermark brings very little distortion to the image.

Receivers of the matrix of difference values or the matrix of the pixel values may use the cipher key table to reduce the watermark. (See Mitchell D. Swanson et al., "Multi-media data-embedding and watermarking technologies", Proceedings of IEEE, 86(6); 1064–1087, June 1998.)

Among the technologies in embedding watermarks into digital files in the transformation domain, the technology disclosed by Cox et al. was recognized as pioneer. See Ingemar J. Cox et al., "Secure spectrum watermarking for multimedia", IEEE Trans. on Image Processing, 6(12): 1673–1687, June 1997. This technology related to watermarking of DCT (discrete cosine transform) processed images.

In Cox et al.'s invention, watermark data are embedded into the middle-band frequencies of a DCT processed image file. The reason why Cox et al. selected the middle band to embed the watermark was partially because greater robustness may be obtained. In the middle band of a DCT image file, the perceptual significance of the image is greater so that damages or distortions to the image because of the watermarking may be tolerable.

In Cox et al.'s invention, the watermark was generated by a Gaussian random number generator. The watermark may be represented by a one dimensional matrix X, X=[$x_1$, $x_2$, ..., $x_n$], wherein $x_i$=0 or 1. A digital file V (V=[$v_1$, $v_2$, ..., $v_m$]) is embedded with the watermark file X, with the following equation, to obtain a watermarked file V',
V'=[v1', v2', ..., vm']

$$Vi' = Vi(1 + xi\ \alpha)$$

wherein i=1, 2, ..., n; vi' represents DCT coefficients of the watermarked file; vi represents DCT coefficients of the original digital file; xi represents elements of the watermark file; and α represents a scalar vector.

After the watermarked digital file is received, the original digital file and the watermark file may be obtained by reverse DCT processing of the watermarked file. In other words, the original digital file and the watermarked digital file are both DCT processed. Substrate the watermarked file with the original digital file and a file of DCT coefficients which is similar to the watermark file may be obtained. Reverse DCT process the obtained watermark file and the watermark may be reduced.

After Cox et al.'s invention, several studies were made by researchers in this field and a variety of watermarking technologies in the DCT transformation domain were developed and disclosed.

OBJECTIVES OF THE INVENTION

The objective of this invention is to provide a watermarking method and a watermarking device to automatically embed a watermark into a digital data file.

Another objective of this invention is to provide a systemized watermarking technology to embed a watermark into a digital image file.

Another objective of this invention is to provide a watermarking technology whereby watermark embedded in a digital image file may not be easily detected.

Another objective of this invention is to provide a watermarking technology whereby watermark embedded in a digital image file has a relative high robustness.

Another objective of this invention is to provide a method and a device to generate a digital watermark and to embed the digital watermark in to a digital image file in the transformation domain.

SUMMARY OF INVENTION

According to this invention, a watermarking method and device to embed a digitized watermark into a digital image file in the transformation domain is disclosed. The digital watermark is embedded into the digital image file with low perceptibility. In the watermarking technology of this invention, the digitized watermark is first error corrected to enhance its robustness. The digital image file to be embedded with the digitized watermark is first processed such that capacity of each element of the digital image file is calculated. The capacity of an element of the digital image file represents the highest value of tolerance for an element of the watermark to be added to the said element of the digital image file. Elements of the digital image file to which watermark elements may be added are selected and their addresses are recorded. The selected elements are then modulated so that they are suited to be embedded with elements of the digital watermark. After modulation the digitized watermark is embedded into the digital file by distributing the modulated elements of the watermark into the selected addresses. A 3*3 mask is used to calculate the capacity of each element of the digital image file.

These and other objectives and advantages of this invention may be clearly understood from the detailed description by referring to the following drawings.

DETAILED DESCRIPTION OF THE INVENTION

Figure 1:
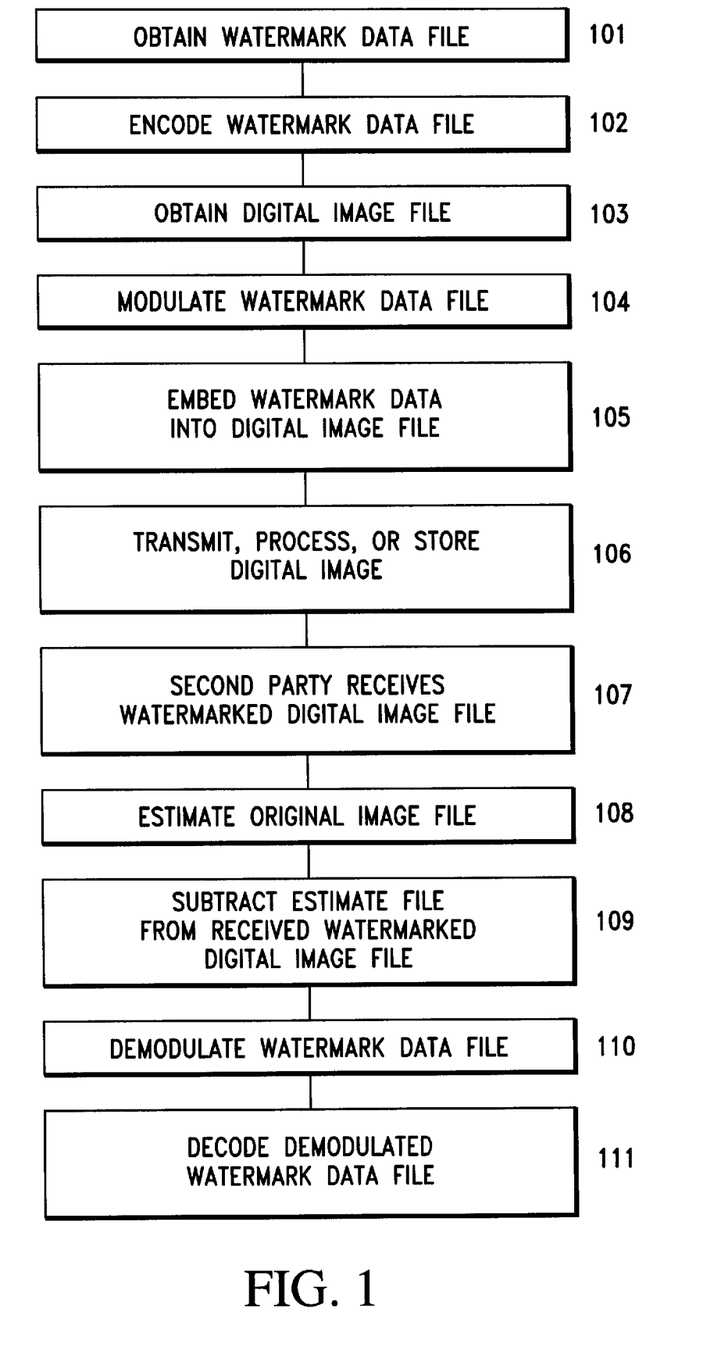
FIG. 1 illustrates the flow chart of the method for watermarking of digitized image of this invention.

FIG. 1 illustrates the flow chart of the method for watermarking of digitized image of this invention. As shown in this invention, in embedding a watermark into a digital image file, at 101 a watermark data file is obtained. If the watermark is a text data file, it may be in a suited format, such as the ASCII format. If it is an image, the file may be a string of gray levels. At 102 the watermark data file is encoded with a error correction encoder, such that the watermark data may be resistant to all kinds of processing such as compression, transmission, storage etc. Here, proper encoder includes the BCH (Bose-Chaudhuri-Hocquenghem) encoder program. Other encoding tools may also be applicable in this invention, as long as they may enhance the error correction rate of the watermark data.

At 103 a digital image file to be embedded with the watermark data is obtained. At 104 the watermark data file is modulated according to the features of the digital image file, such that the watermark data may be embedded to the digital image file. After the modulation, the watermark data file may be in the form of a string. At 105 the watermark data is embedded into the digital image file. The modulation and embedding methods of the watermark data of this invention will be described in detail hereinafter. The embedding of the watermark data includes inserting the pixel data of the watermark data file into selected addresses in the digital image file, in the format and content after the modulation.

At 106 the watermarked image file may be transmitted or stored, or processed with a conventional method. At 107 the watermarked digital image file is obtained by a second party and is subject to processing. If the second party does not have the original, unwatermarked image file, at 108 the original image file is estimated with a suited technology and an image similar to the original image is obtained. The estimation of the original image file is not the core of this invention and may be accomplished with the conventional art, detailed description thereof is thus omitted.

At 109 the watermarked image file as received is subtracted by the estimated image file and the watermark data file is obtained. At 110 the watermark data file is demodulated with the modulator of step 104. At 111 decode the demodulated watermark data file with an error correction decoder and the watermark data file is obtained.

The modulation of the watermark data file is one of the most important features of this invention. The invented modulation technology modulates the watermark data file so that it is suited to be embedded into a digital image file. Detailed description of the modulation technology will be given in the followings. It is noted that the modulation technology of this invention is used to modulate the watermark data such that the watermark data are embedded into the digital image file in its transformation domain. In this invention, the watermark data are embedded into the digital image file in DCT domain.

Although it is not intended to limit the scope of this invention, in designing a watermarking technology, the capacity, imperceptibility and robustness of the watermark shall be taken for consideration.

According to this invention, better capacity to contain watermark data in the digital image file may be obtained, if characteristics of the digital image file to be embedded with the watermark are properly utilized. A useful watermarking technology shall be able to allocate sufficient space to embed a watermark into a digital image file. In embedding the digital watermark, the watermark shall not be perceptible to human senses or machine detection. In addition, the digital watermark shall have enough resistance to data processing such as compression, conversion, transformation and transmission.

According to this invention, the perception of human senses to visual data is limited to a so-called "masking" phenomenon. In other words, the perception of human senses to a visual signal is influenced and reduced by visual signals adjacent to that visual signal. The influence from the adjacent signals may be called "masker" of a visual signal. Signals with stronger maskers may be suited to embed or hide the digital watermark, such that the watermark may not be perceptive to human senses.

In the digital watermarking technology of this invention, a method to calculate the power of the maskers in the transformation domain, such as in the frequency transformation domain, is provided. The method of this invention is able to locate sufficient space to embed the watermark into a digital image file, whereby the watermark is not perceptive to human senses. The invented method includes using the correlation of elements of the digital image file, after being compresses in a particular approach, to design a masking function.

For the DCT coefficients of an image file, the highest value of power of watermark signal which the DCT coefficients may tolerate, such that the watermark may not be perceptive to human senses, may be call "tolerance value" of the DCT coefficients. This tolerance value may be seen as the capacity of the DCT coefficients.

Figure 2:
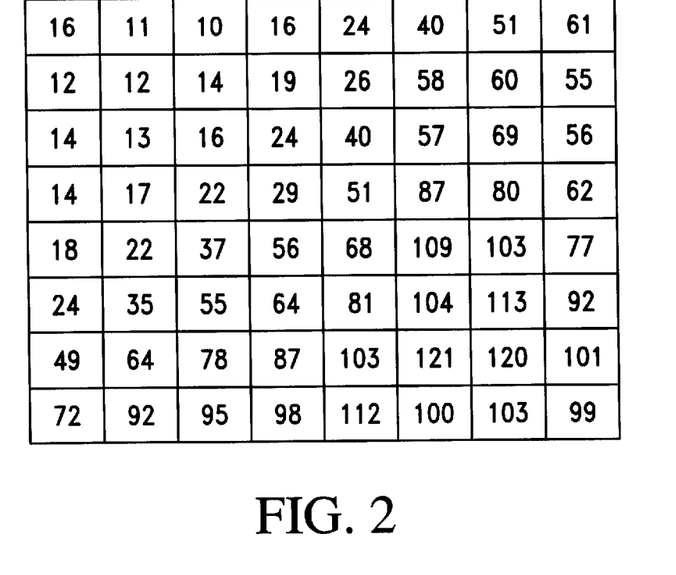
FIG. 2 shows a JPEG quantization matrix applicable in this invention.

In this invention, the tolerance values may be calculated according to the following equation:

Matrix of tolerance values=Matrix of *DCT* watermark power factor\*Matrix of JPEG quantization (1)

Wherein DCT watermark power factor may be power factor under the JPEG standard. A useful JPEG quantization table is shown in FIG. 2. In the application of this invention, the DCT watermark power factor may be adjusted by scaling, such that its value varies within a certain scope.

Figure 3:
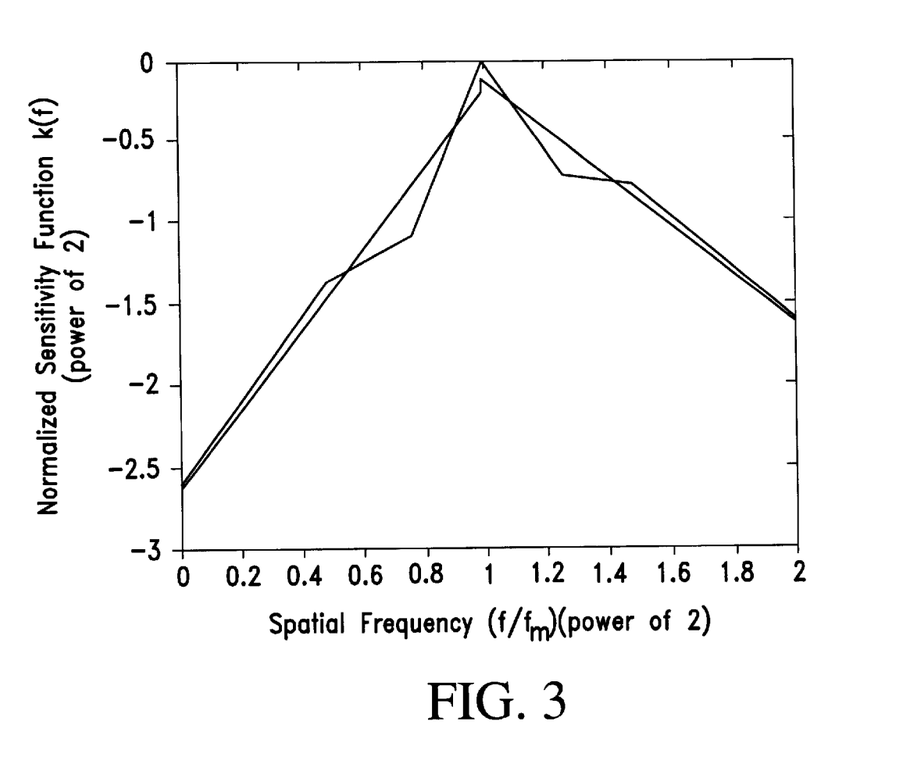
FIG. 3 illustrates a table of image frequency-masking function, as applicable in this invention.

Considering the perceptibility of human senses to watermarks, this invention provided a masking technology to adjust the tolerance value, so that the influence of the masking phenomenon to the tolerance value of the coefficients may be correctly decided. FIG. 3 illustrates a frequency-masking function of an image applicable in this invention. In this figure, the X axis represents the frequency distribution of an image and the Y axis represents the power of the masking phenomenon.

As a result, the DCT watermark power factor may be scaled according to the following equation:

If *DCT* watermark power factor<50, then let Scaling=5000/(*DCT* watermark power factor);

Otherwise

Scaling=200−(*DCT* watermark power factor)\*2.

Note that, when DCT watermark power factor is 100, scaling is 0, whereby all elements in the matrix will be 1, representing minimum quantization loss.

Figure 4:
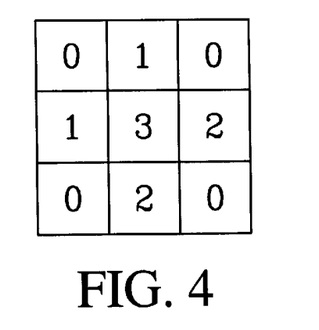
FIG. 4 illustrates a mask used in the calculation of the capacity to contain watermark data of the DCT coefficients of a digital image file.

In an embodiment of this invention, a simplified 3\*3 mask matrix s used to calculate the tolerance values of the DCT coefficients of an image. A 3\*3 mask applicable in this invention is shown in FIG. 4. As a result, the perceptibility of human senses to a DCT coefficient may be calculated according to the following equation:

*DCT* domain human visual sensitivity value=tolerance matrix\*masking matrix (2)

The capacity of a DCT coefficient to contain the watermark information up to the watermark information may be perceptive to human sense (C) may be calculated according to the following equation, while other factors, such as errors, noises during the processing and transmission of the image file, are taken for consideration:

$C=1/2*\log 2$ (*DCT* domain human visual sensitivity)/(image manipulation noise power)+(quantization noise) (3)

If the image file has been processed for several times, sum of all the noise powers is calculated.

Figure 5:
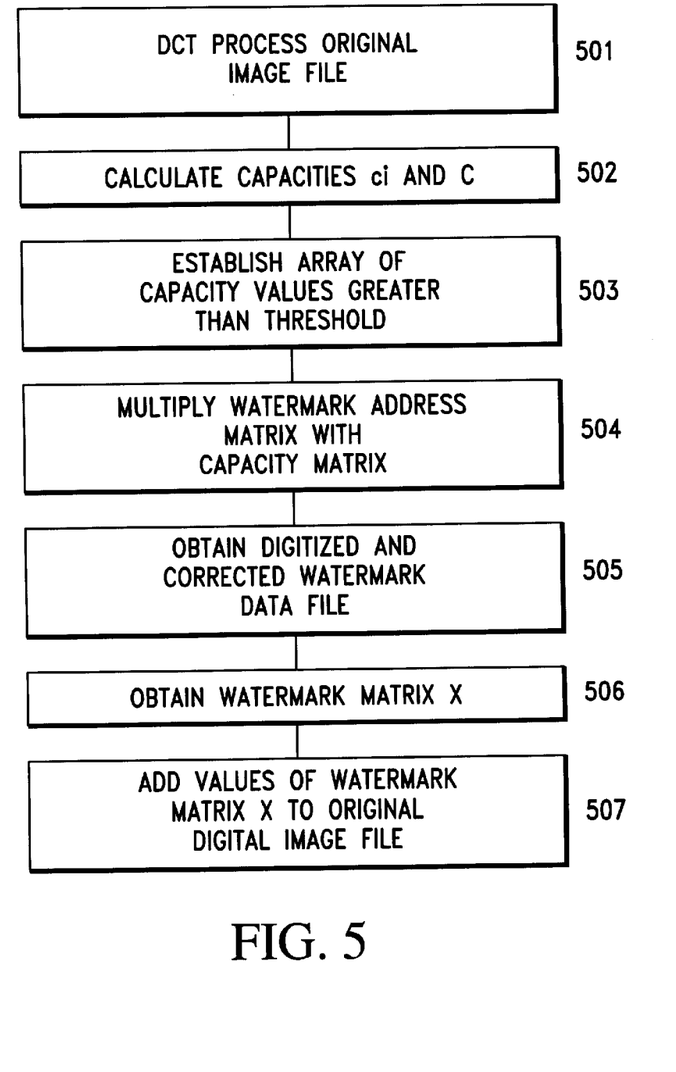
FIG. 5 illustrates the flow chart of the method for modulation of watermark data applicable in this invention.

From the above description the modulation of the watermark information of this invention may be described as follows. FIG. 5 illustrates the flow chart of the method for modulating the watermark data of this invention. As shown in this figure, at 501 an original digital image file is obtained and is DCT processed to obtain a matrix of its DCT coefficients V, V=V1, V2, . . . , Vn. At 502 the capacity ($c_i$) of each DCT coefficient of the image file is calculated and the total capacity (C) of the image file is also obtained. In the calculation of the capacity of each pixel and the total capacity of the digital file, equations 1, 2 and 3 are used. If the digital file is a colored image file, the capacity of each primary color is calculated. In this step, the capacity of each DCT coefficient and the total capacity of the image file are stored for further use.

In the preceding step an array or a matrix of capacity is obtained. At 503 capacity values greater than a threshold (such as 1) are labeled and picked up to establish an array or a matrix of capacity values greater than the threshold. This array or matrix may be called the "watermark address matrix". In this step, it is recommendable to select a certain number (such as $2^{12}$) of addresses with the greatest capacity values to establish the watermark address matrix. This watermark address matrix may be used as matrix of addresses wherein watermark data are embedded. Here, the label may be a number of 1, while the unlabeled pixels are filled with −1. At 504 the watermark address matrix is multiplied with the capacity matrix to obtain an imperceptibility matrix. At 505 the digitized and error corrected watermark data file is obtained. At 506 the values of the watermark data file are multiplied by the positive capacity values in the imperceptibility matrix in sequence and a watermark matrix X is obtained, wherein X=x1, x2, ..., xn. At 507 values of the watermark matrix are added into the original digital image file, at the addresses with positive imperceptibility values. A watermarked image file is thus obtained, as follows:

$$vi'=vi(1+xi\ \alpha) \quad (4)$$

Wherein vi' represents DCT coefficients of the watermarked image file, vi represents the DCT coefficients of the original digital image file, xi represents the watermark data obtain from step 506 and α represents a adjustment factor. Embodiment The famous "Lena" image (512*512 pixels) is used in the embodiment of this invention, to illustrate how the capacity of pixels of an image and the total capacity of the image file are calculated.

Figure 6:
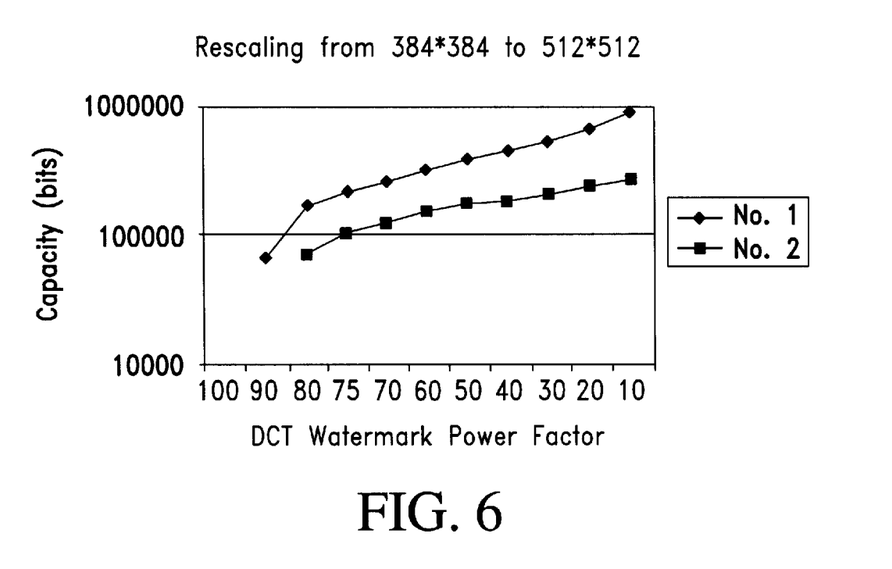
FIG. 6 shows the total capacity and number of locations with capacity greater than 1 bit, both of the image file "Lena", as calculated under different PCT domain watermark power factor according to this invention.

Table 1 shows the total capacity and number of locations with capacity greater than 1 bit, both of the image file "Lena", as calculated under different PCT domain watermark power factor according to this invention. As shown in this figure, it is possible to locate in an ordinary image file sufficient number of addresses with high capacity and low perceptibility, so to embed a watermark.

Figure 7:
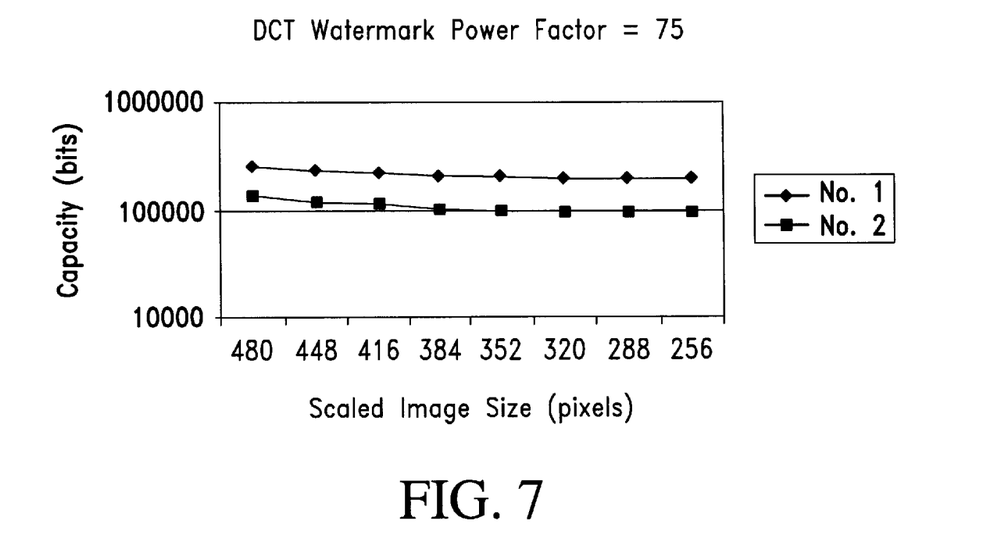
FIG. 7 shows the total capacity of the sealed image file and number of locations with capacity greater than 1 bit in the image file, calculated according to this invention when PCT watermark power factor is 75.

The image file "Lena" is then scaled to a smaller size and capacity of its pixels is calculated. Table 2 shows the total capacity of the scaled image file and number of locations with capacity greater than 1 bit in the image file, calculated according to this invention when PCT watermark power factor is 75.

Figure 8:
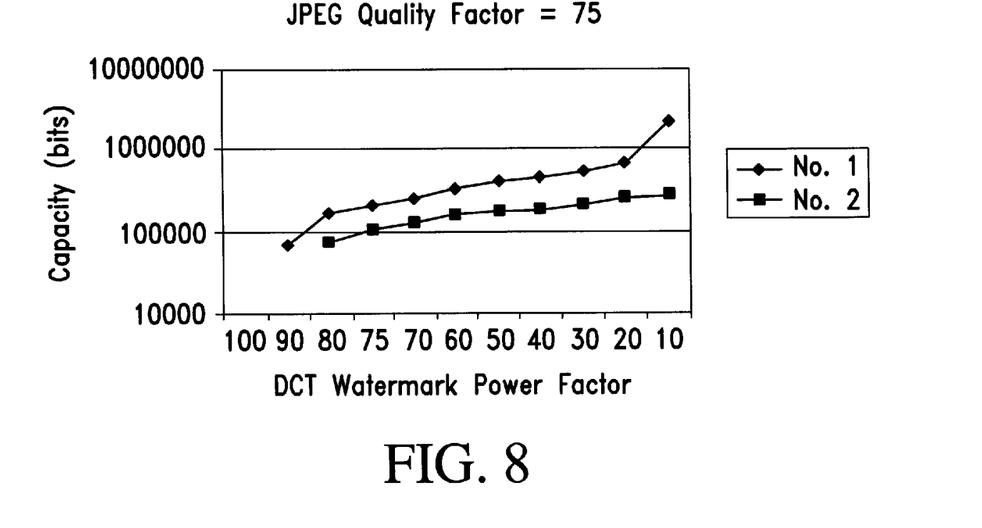
FIG. 8 shows the total capacity of the compressed image and number of locations with capacity greater than 1 bit in the image file.

The image file "Lena" is compressed under the JPEG standard. The capacity is calculated with the a JPEG quality factor of 75. Table 3 shows the total capacity of the compressed image and number of locations with capacity greater than 1 bit in the image file.

Figure 9:
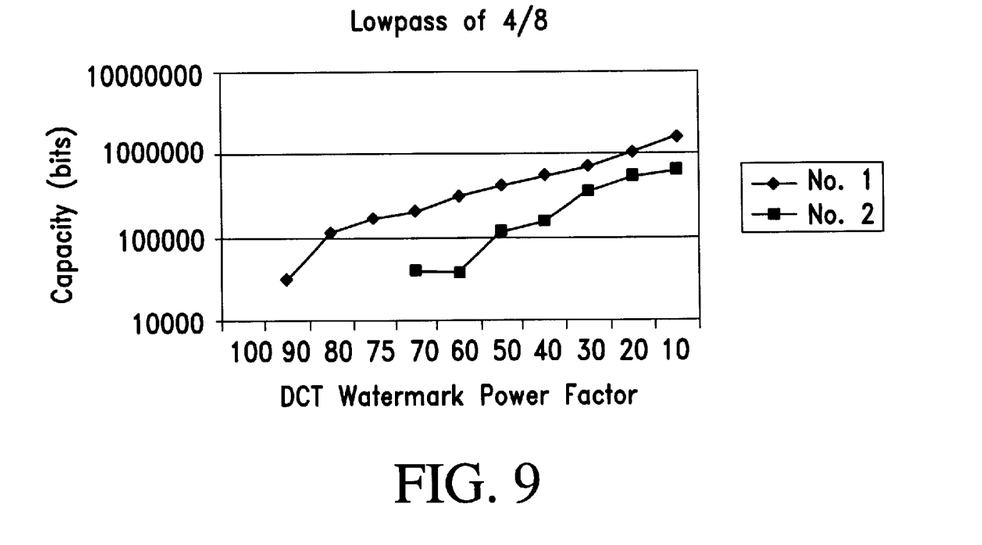
FIG. 9 shows the total capacity of the filtered image file and number of locations with capacity greater than 1 bit in the image file "Lena", under a low-pass of 4/8.

The image file "Lena" is filtered with a low-pass filter. The capacity is calculated. Table 4 shows the total capacity of the filtered image file and number of locations with capacity greater than 1 bit in the image file "Lena", under a low-pass of 4/8.

As shown in these tables, the watermarking technology of this invention is useful in allocating sufficient number of addresses in an image file at which DCT coefficients are of high capacity and low perceptibility, when a watermark data file is embedded thereto. The image file as embedded with the watermark is resistant to a variety of processing, including compressing, scaling and filtering.

As the present invention has been shown and described with reference to preferred embodiments thereof, those skilled in the art will recognize that the above and other changes may be made therein without departing from the spirit and scope of the invention.

What is claimed is:

1. A method to embed into a digitized file a watermark, comprising:
    obtaining a modulated digitized image file;
    obtaining a modulated digitized watermark file;
    allocating in said digitized image file portions where human sense is less sensible to additional data being added into said portions; and
    adding into at least a part of said portions data representing said modulated digitized watermark file,
    wherein said step of allocating portions where human sense is less sensible to additional data being added comprises allocating elements in the transformation domain of said digitized image file to which additional data may be added with less sensibility by human sense, and also comprises the steps of:
        calculating capacity values of all elements in the transform domain of said digitized image file to obtain a matrix of said capacity values, said capacity values representing a power of resistance to noises of said elements;
        calculating, according to values and positions of said capacity values in said matrix of capacity values, human-sensibility values corresponding to each of said capacity values to obtain a matrix of human-sensibility values; and
        labeling in said matrix of human-sensibility values elements with human-sensibility values greater than a predetermined threshold.

2. The method according to claim 1 wherein said step of calculating human-sensibility values comprises multiplication of power factors under JPEG standard and a quantization matrix under JPEG standard.

3. The method according to claim 1, further comprising a step of scaling said capacity values to be within a predetermined scope.

4. The method according to claim 1, further comprising a step of adjusting said human-sensibility values with noise values which may be brought to said digitized image file during processing and quantization.

5. The method according to claim 1 wherein said step of calculating said human-sensibility values comprises calculating the sum of multiplying values of each element in the transformation domain of said digitized image file and values of elements surrounding said element with a 3*3 mask.

6. The method according to claim 5 wherein values of elements of said 3*3 mask are

| 0 | 1 | 0 |
|---|---|---|
| 1 | 3 | 2 |
| 0 | 2 | 0 |

7. The method according to claim 1 wherein said step of adding into said digitized watermark file further comprises adjusting values of elements of said digitized watermark with scaling factors.

8. A device for processing of a digitized image file wherein operation of said device comprises:
    obtaining a modulated digitized image file;
    obtaining a modulated digitized watermark file;
    allocating in said digitized image file portions where human sense is less sensible to additional data being added into said portions; and
    adding into at least a part of said portions data representing said modulated digitized watermark file,
    wherein said operation of allocating portions where human sense is less sensible to additional data being added comprises allocating elements in the transformation domain of said digitized image file to which additional data may be added with less sensibility by human sense, and also comprises the operations of:
        calculating capacity values of all elements in the transform domain of said digitized image file to obtain a matrix of said capacity values, said capacity values representing a power of resistance to noises of said elements;

calculating, according to values and positions of said capacity values in said matrix of capacity values, human-sensibility values corresponding to each of said capacity values to obtain a matrix of human-sensibility values; and labeling in said matrix of human-sensibility values elements with human-sensibility values greater than a predetermined threshold.

9. The device according to claim 8 wherein said operation of calculating human-sensibility values comprises multiplication of power factors under JPEG standard and a quantization matrix under JPEG standard.

10. The device according to claim 8 wherein said operation of calculating said human-sensibility values comprises calculating the sum of multiplying values of each element in the transformation domain of said digitized image file and values of elements surrounding said element with a 3*3 mask.

11. The device according to claim 10 wherein values of elements of said 3*3 mask are

| | | |
|---|---|---|
| 0 | 1 | 0 |
| 1 | 3 | 2 |
| 0 | 2 | 0 |

12. The device according to claim 8 wherein said operation of adding into said digitized watermark file further comprises adjusting values of elements of said digitized watermark with scaling factors.

* * * * *